United States Patent
Stambaugh et al.

(10) Patent No.: US 8,382,357 B2
(45) Date of Patent: Feb. 26, 2013

(54) USER INTERFACE WITH MEANS FOR LIGHT BLEED MITIGATION

(75) Inventors: Deron Stambaugh, Waterman, IL (US); Anthony Russo, Bartlett, IL (US)

(73) Assignee: TouchSensor Technologies, LLC, Wheaton, IL (US)

( * ) Notice: Subject to any disclaimer, the term of this patent is extended or adjusted under 35 U.S.C. 154(b) by 434 days.

(21) Appl. No.: 12/690,003

(22) Filed: Jan. 19, 2010

(65) Prior Publication Data

US 2010/0182785 A1 Jul. 22, 2010

Related U.S. Application Data

(60) Provisional application No. 61/145,916, filed on Jan. 20, 2009.

(51) Int. Cl.
*F21V 7/04* (2006.01)
(52) U.S. Cl. ........ 362/612; 362/235; 345/173; 345/161; 345/156
(58) Field of Classification Search .................. 362/235, 362/23, 28, 29; 345/173, 161, 156
See application file for complete search history.

(56) References Cited

U.S. PATENT DOCUMENTS

| | | | |
|---|---|---|---|
| 5,397,867 A | | 3/1995 | Demeo |
| 5,477,422 A | * | 12/1995 | Hooker et al. .................. 362/29 |
| 2007/0015982 A1 | * | 1/2007 | Delonzor et al. ............. 600/344 |

FOREIGN PATENT DOCUMENTS

JP 05-135654 6/1993

OTHER PUBLICATIONS

Int'l Search Report & Written Opinion issued in app. No. PCT/US2010/021418 (2010).
Touchsensor Technologies, LLC, Reference 1.
Touchsensor Technologies, LLC, Reference 2.
Touchsensor Technologies, LLC, Reference 3.

* cited by examiner

*Primary Examiner* — Evan Dzierzynski
*Assistant Examiner* — Danielle Allen
(74) *Attorney, Agent, or Firm* — Barnes & Thornburg LLP

(57) ABSTRACT

A light-transmissive substrate includes an arrangement of penetrations extending from one surface of the substrate toward another surface of the substrate. The penetrations are configured to attenuate or inhibit transmission of light through the substrate from one side of the arrangement of penetrations to the other side of the arrangement of penetrations.

17 Claims, 2 Drawing Sheets

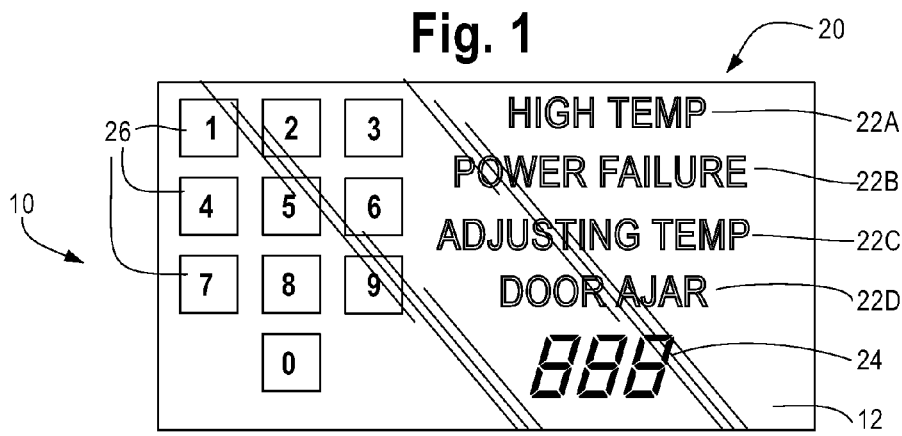
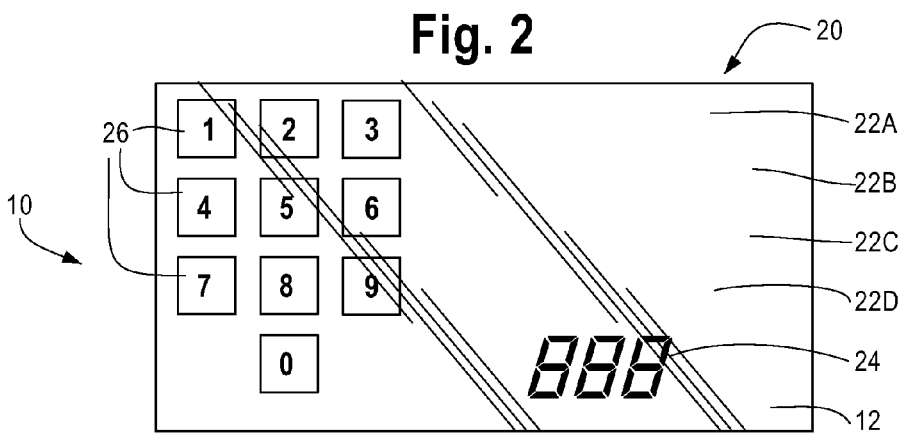
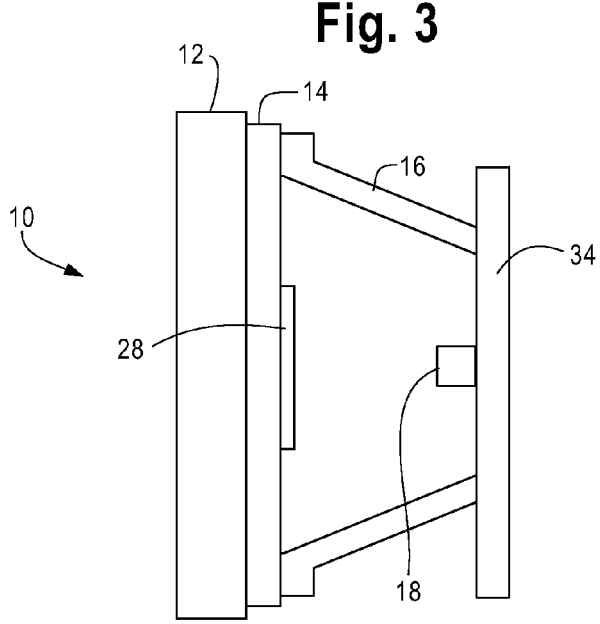

USER INTERFACE WITH MEANS FOR LIGHT BLEED MITIGATION

CROSS-REFERENCE TO RELATED APPLICATIONS

This application claims priority from, and incorporates by reference the disclosure of, U.S. Provisional Patent Application No. 61/145,916, which was filed on Jan. 20, 2009.

BACKGROUND OF THE INVENTION

A user interface provides a means for a user to interact with an apparatus or device, for example, an appliance, an automobile, or a piece of industrial equipment. A user interface can include displays for monitoring the status of the apparatus and switches or sensors for controlling the apparatus. Displays can take the form of simple indicator lights, pictorial displays, fixed alphanumeric displays, or multi-segment, reconfigurable alphanumeric displays, among others. Switches and sensors can take the form of membrane or other electro-mechanical switches or electronic sensors, for example, capacitive or field effect sensors, among others.

Such displays and sensors can be borne on or integrated into some form of user interface panel. A user interface panel can be embodied as an integral part of an apparatus, for example, the housing of an industrial machine. Alternatively, a user interface panel can be embodied as a distinct substrate than can be attached to an apparatus or located apart from the apparatus to enable remote monitoring or control of the apparatus. A user interface could be embodied in other forms, as well.

A user interface can include lighting means for backlighting displays and touch surfaces corresponding to touch switches. Such lighting means can include light sources for selectively backlighting individual displays and touch surfaces and light guides that channel light from individual light sources toward corresponding individual displays and touch surfaces.

BRIEF DESCRIPTION OF THE DRAWINGS

FIG. 1 illustrates a user interface 10 as it would be seen by a user, including a user interface panel 12 having a user interface surface 20, touch input surfaces 26 disposed on user interface surface 20 and corresponding to sensors located behind user interface panel 12, fixed displays 22A-22D in an illuminated state, and a reconfigurable display 24;

FIG. 2 illustrates the user interface panel 12 of FIG. 1 with fixed displays 22A-22D in an un-illuminated state;

FIG. 3 is a cross section of user interface 10 including user interface panel 12 having user interface surface 20, a printed wiring board 14 behind user interface panel 12, a light guide 16 associated with printed wiring board 14, and a light source 18 mounted on a light source board 34 and associated with light guide 16;

DETAILED DESCRIPTION OF THE ILLUSTRATED EMBODIMENTS

Figure 4:
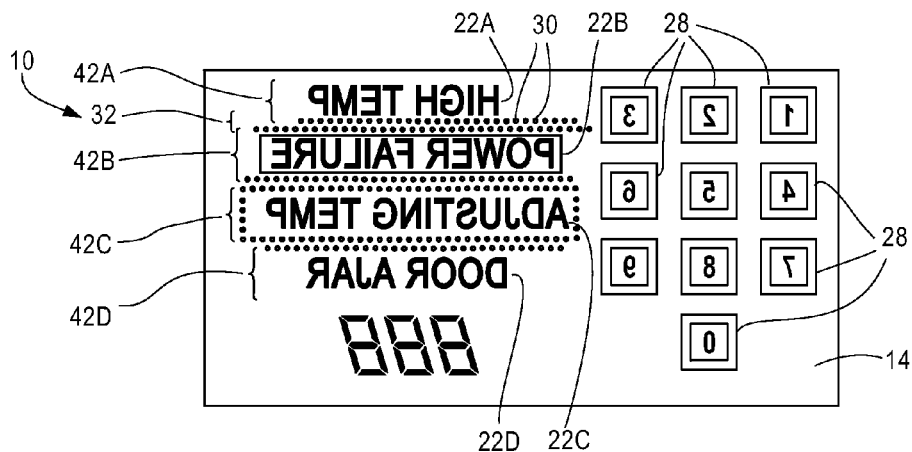
FIG. 4 is a rear view of printed wiring board 14 including four lines of text corresponding to fixed displays 22A-22D, three arrays 32 of penetrations 30 positioned between respective lines of text, and a touch sensor 28.

FIGS. 1 and 2 illustrate an exemplary user interface 10 as it typically would be viewed by a user. As shown in these drawings, exemplary user interface 10 includes a user interface panel 12 defining a user interface surface 20. User interface surface 20 includes a number of fixed displays 22A-22D, a reconfigurable display 24, and a number of touch surfaces 26 corresponding to sensors 28 (see FIGS. 3 and 4) located behind user interface panel 12. Fixed displays 22A-22D are illustrated as involving alpha text but could also or alternatively involve numeric text, alpha-numeric text, and/or pictorial/graphic information. The foregoing displays could, for example, provide information regarding a corresponding piece of equipment, such as a household appliance, and the foregoing sensors could be used to control the piece of equipment. Other embodiments could include more or fewer displays and touch surfaces or could omit certain of these features altogether.

Lighting means can be provided behind user interface panel 12 to provide backlighting for one or more of the foregoing displays and/or touch surfaces, as will be discussed further below. Such lighting means could be energized selectively to backlight one or more of the foregoing displays and/or touch surfaces on demand. With the lighting means corresponding to a particular display or touch surface in an energized state, the display or touch surface would be backlit to a highlighted or simply visible state. For example, FIG. 1 shows fixed displays 22A-22D in a highlighted/visible state as they might appear with the corresponding lighting means energized. With the lighting means in a de-energized state, the corresponding display or touch surface would be in a dimmed state or a generally invisible state. For example, with such lighting means in the de-energized state, the corresponding display or touch surface could appear opaque or otherwise generally conform in appearance to the area of user interface surface 20 abutting such display or touch surface. FIG. 2, for example, illustrates fixed displays 22A-22D in a generally invisible state.

User interface panel 12 could be made of glass, plastic, or another suitable material, as would be recognized by one skilled in the art. User interface panel 12 could be generally light transmissive. Alternatively, it could be generally dark or opaque in appearance, provided that portions thereof to be backlit, for example, the areas corresponding to displays 22A-22D, 24 and touch surfaces 26, are sufficiently light-transmissive to allow such backlighting. User interface panel 12 may be decorated with indicia identifying the location and/or function of touch surfaces 26 and/or providing text and/or graphic/pictorial information for fixed alpha displays 22A-22D. Such decoration may be located on the front or rear surface of user interface panel 12 and may be applied by any known technique. For example, decoration may be applied to the front or rear surface of user interface panel 12 using a screen printing or other process or disposed on a decal attached to user interface panel 12.

FIG. 3 illustrates exemplary user interface 10 in cross section. As shown in this drawing, exemplary user interface 10 further includes a printed wiring board 14 disposed behind the rear surface of user interface panel 12. Printed wiring board 14 could be made of FR-4 or another suitable material, as would be recognized by one skilled in the art. Printed wiring board 14 could be generally light-transmissive. Alternatively, it could include one or more generally opaque portions and one or more light-transmissive portions corresponding to areas thereof to be backlit, for example, the areas corresponding to displays 22A-22D, 24 and touch surfaces 26. Such light-transmissive portions would be sufficiently translucent or transparent to allow light to pass from a rear surface to a front surface of printed wiring board 14 and subsequently through a corresponding portion of user interface panel 12.

FIG. 4 illustrates the rear surface of an exemplary of printed wiring board. Printed wiring board 14 could bear electrical circuits and circuit components, for example, sensors 28 corresponding to touch surfaces 26 disposed on user interface surface 20. Such electrical circuits and circuit components, other than portions of sensors 28, have been omitted from FIG. 4 for clarity. Sensors 28 could include one or more sensing electrodes and electrical circuit components. Sensors 28 could be embodied, for example, as one or more sensing electrodes coupled to corresponding TS-100 integrated control circuits available from TouchSensor Technologies, LLC of Wheaton, Ill. Such sensing electrodes or portions thereof could be light-transmissive to allow backlighting there through.

As illustrated in FIG. 4, printed wiring board 14 could bear an optical mask or integral decoration that defines, for example, the location and/or function of touch surfaces 26 and/or text and/or graphic/pictorial information of fixed displays 22A-22D, as would be recognized by one skilled in the art. Such an optical mask or integrated decoration could be disposed on the surface of printed wiring board 14 abutting user interface panel 12 or elsewhere. Such optical mask or integral decoration could be screen printed onto printed wiring board 14, provided as a decal applied to printed wiring board 14, or otherwise disposed on printed wiring board 14. Such embodiments could obviate the need or desire for providing decoration on user interface panel 12 that identifies or provides information directed to, for example, fixed displays 22A-22D. In some embodiments, particularly embodiments wherein printed wiring board 14 bears such decoration, the front surface of printed wiring board 14 could serve as user interface surface 20 and user interface panel 12 could be omitted.

As illustrated in, for example, FIG. 4, printed wiring board 14 includes one or more arrays 32 of penetrations 30 formed therein. Penetrations 30 can be embodied as perforations in printed wiring board 14 or as cavities extending from either the front or rear surface of printed wiring board 14 toward, but not through, the other of the front and rear surface of printed wiring board 14. In embodiments wherein penetrations 30 are embodied as cavities, their effectiveness in controlling light transmission may improve with increasing depth into printed wiring board 14. That is, relatively deep cavities may be more effective in controlling light transmission than relatively shallow cavities.

Each penetration 30 defines a side wall. The side wall can, but need not, be coated with a reflective material. In some embodiments, penetrations 30 can have a generally circular cross section with a diameter of about 0.003-0.020 inch. In other embodiments, circular penetrations 30 can have greater or smaller diameters. Penetrations 30 can have other shapes and sizes, as well. Penetrations 30 could be formed by punching, drilling, or any other suitable technique.

Figure 5A:
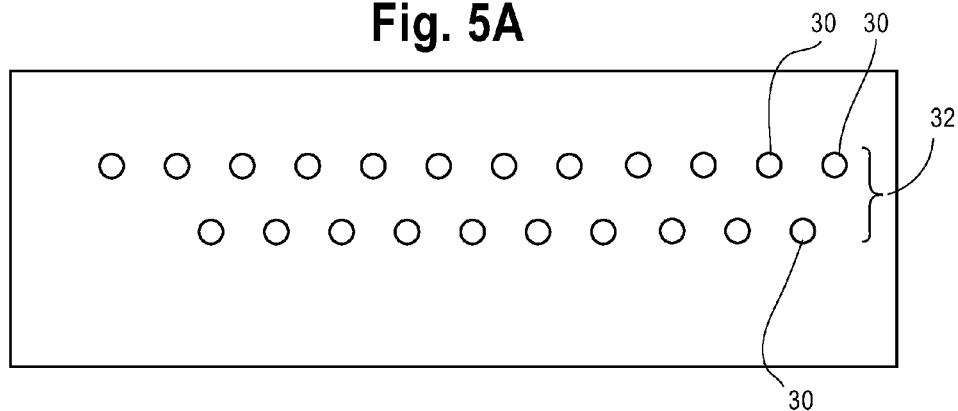
FIG. 5A illustrates the light-blocking effects of an embodiment of arrays 32 of penetrations 22A-22D.
Figure 5B:
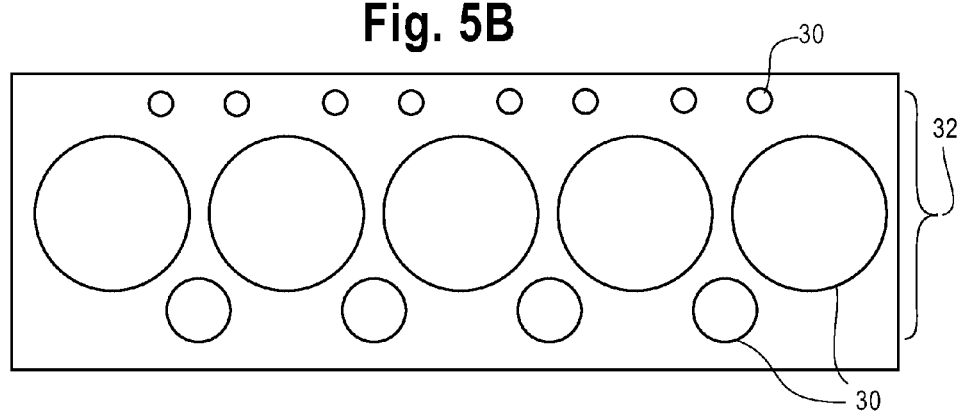
FIG. 5B illustrates the light-blocking effects of another embodiment of arrays 32 of penetrations 22A-22D.

In the exemplary embodiment illustrated in FIG. 4, a first array 32 of penetrations 30 is located between area 42A of printed wiring board 14 corresponding to fixed display 22A and area 42B of printed wiring board 14 corresponding to fixed display 22B, a second array 32 of penetrations 30 is located between area 42B of printed wiring board 14 corresponding to fixed display 22B and area 42C of printed wiring board 14 corresponding to fixed display 22C, and a third array 32 of penetrations 30 is located between area 42C of printed wiring board 14 corresponding to fixed display 22C and area 42D of printed wiring board 14 corresponding to fixed display 22D. Each such array includes two rows of penetrations 30 offset from one another, as further shown in FIG. 5A. Alternatively, rows of penetrations 30 in an array could be aligned one atop the other. In other embodiments, one or more such arrays could be configured as shown in FIG. 5B, as discussed further below. In further embodiments, one or more arrays 32 of penetrations 30 could be configured in other ways and located elsewhere, as desired. An array could include more or fewer rows of penetrations than illustrated or otherwise described above.

Arrays 32 of penetrations 30 can be open-ended, or they can form a closed loop, as desired, to control light bleed through printed wiring board 14, as discussed further below. With reference to FIG. 4, penetrations 30 generally separating areas 42A and 42B represent one embodiment of an open-ended array, and penetrations 30 generally surrounding area 42C represent one embodiment of an array forming a closed loop. Portions of this array include only a single row of penetrations 30 but could include multiple rows in other embodiments. Both open-ended and closed loop arrays can be configured in many other ways, as well, including curvilinear and/or generally straight segments.

Arrays 32 of penetrations 30 are arranged to attenuate transmission of light laterally through printed wiring board 14, for example, from area 42A to 42B and vice versa, from area 42B to area 42C and vice versa, and from area 42C to area 42D and vice versa. At least some light directed laterally through printed wiring board 14 toward an array 32 of penetrations 30 is reflected off of the penetrations 30 and, where provided, the reflective coating applied to the side walls of penetrations 30. In the embodiment illustrated in FIG. 5A, array 32 of penetrations 30 is configured such that some light rays directed toward array 32 are reflected by penetrations 30, while other light rays directed toward array 32 can pass directly through array 32 without impinging and reflecting off of penetrations 30. In the embodiment illustrated in FIG. 5B, array 32 of penetrations 30 is configured such that all light rays directed toward array 32 are reflected by penetrations 30, and no light ray directed toward array 32 can pass directly there through.

Array 32 illustrated in FIG. 5B includes three tiers of penetrations 30, including a first tier of penetrations 30 of a first diameter, a second tier of penetrations 30 of a second diameter greater than the first diameter, and a third tier of penetrations 30 of a third diameter greater than the second diameter. The three tiers of penetrations 30 illustrated in FIG. 5B are arranged in three rows, wherein the rows of penetrations 30 having the smaller diameters essentially flank the row of penetrations 30 having the largest diameter. Alternatively, the rows of penetrations 30 having the larger diameters could essentially flank the row of penetrations 30 having the smallest diameter or the rows of penetrations having the largest and smallest diameters could essentially flank the row of penetrations having the intermediate diameter. In the FIG. 5B embodiment, penetrations 30 of the second and third tiers are generally equally spaced. Individual penetrations 30 of the first tier are unequally spaced, but pairs of such penetrations are generally equally spaced. In other embodiments, penetrations 30 and arrays 32 thereof could be configured in other ways, as desired.

In alternate embodiments, printed wiring board 14 could take the form of a flexible circuit carrier applied directly to user interface substrate 12 and penetrations 30 could be located in user interface substrate 12. In further embodiments, printed wiring board could take the form of a flexible circuit carrier applied to another substrate (not shown), such substrate being applied, in turn, to user interface panel 12. In such an embodiment, penetrations 30 could be located in either or both of the other substrate and user interface panel 12. In any of the foregoing embodiments, the flexible circuit carrier could, but need not, include penetrations corresponding to penetrations 30.

FIG. 3 also shows an embodiment of lighting means providing backlighting for one of touch surfaces 26 associated with touch sensor 28. This exemplary lighting means includes a light source 18, for example, an LED or lamp, and a light guide 16 optically coupling light source 18 to the area of the rear surface of printed wiring board 14 corresponding to the location of touch surface 26 on user interface panel 12. Light source 18 is illustrated as being mounted on light source board 34, which may include circuitry for operating light source 18. Alternatively, light source 18 could be located elsewhere, for example, on or otherwise attached to light guide 16. In embodiments wherein light source 18 is not mounted on light source board 34, light source board 34 could be omitted or it could be retained and used to carry circuitry for operating light source 18 and/or some other purpose. Light guide 16 can function to direct light from light source 18 to the area of the rear surface of printed wiring board 14 corresponding to the location of touch surface 26 on user interface panel 12, to preclude light emanating from light source 18 from entering other portions of printed wiring board 14, as well as the environment generally, and/or to distribute and diffuse light emanating from light source 18 before it enters the rear surface of printed wiring board 14. Similar lighting means can be provided to backlight any or all of fixed displays 22A-22D and/or other portions of user interface panel 12.

A distinct light source 18 and light guide 16 could be provided in association with each display and touch surface included in user interface panel 12 or only for certain ones of such displays and/or touch surfaces. Alternatively, a particular light source and light guide could be provided in association with more than one display and/or touch surface. More than one light source could be provided in association with a particular light guide. In some embodiments, light guide 16 could be eliminated, particularly where light source 18 is located sufficiently close to the rear surface of printed wiring board 14 such that light emanating from light source 18 is substantially admitted to printed wiring board 14 only in the area thereof corresponding to the display or touch surface light source 18 is intended to illuminate. For example, it may be unnecessary to provide a corresponding light guide 16 where light source 18 is embodied as an OLED or PLED or other source capable of providing diffuse light over a sufficiently broad area to adequately backlight a corresponding display 22A-22D, 24 or touch surface 26 while being located sufficiently near the rear surface of printed wiring board 14 such that light emanating from light source 18 does not enter portions of printed wiring board 14 where such light would not be desired.

The drawings and foregoing description illustrate exemplary embodiments of a user interface apparatus. One skilled in the art would recognize that the exemplary embodiments could be modified in many and various ways without departing from the scope of the claims that follow.

The invention claimed is:

1. An apparatus comprising:
  a light-transmissive substrate having a first surface and a second surface,
  said first surface including a first defined area configured to allow admission of light into said substrate and
  said second surface including a first corresponding defined area configured to allow said light to emanate from said substrate,
  said substrate defining a plurality of perforations extending from said first surface to said second surface, said plurality of perforations configured to inhibit direct transmission of light admitted to said substrate through said first defined area to an area of said front surface outside said first corresponding defined area;
  wherein said plurality of perforations comprises a first tier of perforations having a first diameter, a second tier of perforations having a second diameter larger than said first diameter, and a third tier of perforations having a third diameter larger than said second diameter.

2. The apparatus of claim 1 wherein each of said perforations includes a side wall, said side walls coated with a reflective coating.

3. The apparatus of claim 1 further comprising a light source associated with said first surface such that light emanating from said light source is admitted to said substrate only through said first defined area and transmitted through said substrate to said first corresponding defined area.

4. The apparatus of claim 3 further comprising a light guide associated with said substrate and said light source, said light guide directing said light from said light source to said first defined area.

5. The apparatus of claim 1 wherein said substrate is a printed wiring board.

6. The apparatus of claim 1 further comprising at least one touch switch operably associated with said first corresponding defined area.

7. The apparatus of claim 1 wherein said third tier of perforations is arranged between said first and second tiers of perforations.

8. The apparatus of claim 7 wherein said first, second, and third tiers are arranged in respective rows.

9. The apparatus of claim 1 further comprising indicia associated with said first corresponding defined area.

10. The apparatus of claim 9 wherein said indicia is illuminated by said light.

11. The apparatus of claim 1 wherein said plurality of penetrations is arranged to at least partially surround said first corresponding defined area.

12. The apparatus of claim 1 further comprising:
  a second light source associated with said first surface such that light emanating from said light source is admitted to said substrate through a second defined area of said first surface and transmitted through said substrate to a second corresponding defined area of said front surface;
  wherein said plurality of perforations inhibits direct transmission of light through said substrate from said first defined area to said second corresponding defined area and from said second defined area to said first corresponding defined area.

13. The apparatus of claim 1 further comprising a second substrate overlying said second surface of said substrate.

14. An apparatus comprising:
  a light-transmissive substrate having a rear surface and a front surface,
  said rear surface including a first defined area configured to allow admission of light into said substrate and
  said front surface including a first corresponding defined area configured to allow said light to emanate from said substrate,
  said substrate defining a plurality of cavities extending from one of said front and rear surfaces toward the other of said front and rear surfaces, said plurality of cavities configured to attenuate transmission of light admitted to said substrate through said first defined area of said rear surface to an area of said front surface outside said first corresponding defined area;

wherein said plurality of cavities comprises a first tier of cavities having a first diameter, a second tier of cavities having a second diameter larger than said first diameter, and a third tier of cavities having a third diameter larger than said second diameter.

15. The apparatus of claim 14 wherein each of said cavities includes a side wall, said side walls coated with a reflective coating.

16. The apparatus of claim 14 further comprising a light source associated with said first surface such that light emanating from said light source is admitted to said substrate only through said first defined area and transmitted through said substrate to said first corresponding defined area.

17. The apparatus of claim 16 further comprising a light guide associated with said substrate and said light source, said light guide directing said light from said light source to said first defined area.

* * * * *

UNITED STATES PATENT AND TRADEMARK OFFICE
CERTIFICATE OF CORRECTION

PATENT NO. : 8,382,357 B2
APPLICATION NO. : 12/690003
DATED : February 26, 2013
INVENTOR(S) : Deron Stambaugh and Anthony Russo It is certified that error appears in the above-identified patent and that said Letters Patent is hereby corrected as shown below:

In the Claims:

claim 12, at column 6, line 44, delete the term "claim 2" and add in its place the term --claim 3-- and at claim 12, column 6, line 46, add the word --second-- before the phrase "light source is admitted to."

Signed and Sealed this
Sixteenth Day of July, 2013

Teresa Stanek Rea
*Acting Director of the United States Patent and Trademark Office*